United States Patent Office 2,895,831
Patented July 21, 1959

2,895,831
WHEAT FOOD

Tewfic Zacharia, Beirut, Lebanon, assignor to Proto, International Hygienic Food Co., Beirut, Lebanon, a collective company of Lebanon No Drawing. Application April 24, 1958
Serial No. 730,527

1 Claim. (Cl. 99—90)

This invention relates to a novel wheat food product of high nutritive value, stability, versatility and relatively low calorie content. More particularly, this invention relates to a novel wheat product having a high protein content of good quality and a relatively low starch content. The novel wheat product of the instant invention may be readily combined with conventional food components, including patent flour, milk, etc. in the manufacture of various food products such, for example, as cereals, biscuits and the like.

Prior to this invention, high protein, low starch wheat products, known as gluten products, have been produced by extracting starches from the endosperm of wheat. The resulting gluten products have certain drawbacks. They are not versatile in that they cannot be readily combined in high amounts (above 10%) with conventional flours to produce commercially acceptable products. When gluten is combined with patent flour to form a dough, the resulting dough is lacking in uniformity, elasticity and flexibility. Then too, gluten is not entirely satisfactory in nutritive qualities. In the extraction of starch from the wheat flour, not only is the starch removed by the kneading operation, but also a significant amount of desirable nutritive minerals is removed. Also, in obtaining gluten a substantial amount of desirable protein components such, for example, as nutritive amino acids, is modified. Moreover, the heretofore known gluten products are deficient in vitamin content and other desirable nutritive characteristics.

Moreover, it has not been possible to overcome the deficient nutritive properties of gluten by extracting starches from the whole wheat rather than from the endosperm of the wheat. Although whole wheat contains vitamins and valuable protein materials not found in wheat endosperm, such vitamins and proteins, which are water soluble, would be removed along with the starch if the whole wheat is treated with water. Accordingly, the resulting wheat product would also be deficient in nutritive value.

Accordingly, it is an object of this invention to provide a novel wheat food product of high nutritive value, stability, versatility and relatively low calorie content. It is a further object of this invention to provide a novel wheat product having a high protein content of good quality and relatively low starch content. An additional object of this invention is to provide a novel wheat product, which may be readily combined with conventional food components, including patent flour, milk, etc. in the manufacture of various food products such, for example, cereals, biscuits and the like.

The main bulk of the wheat particle housed within the shell or husk is the endosperm, which contains a high amount of starch and forms the body of milled flour. The separation of the endosperm from broad bran and fine flour component containing fine bran and germ is well known. The usual flour milling process involves cleaning the whole wheat; conditioning the wheat; crushing the wheat, and separating the various wheat fractions by sieving. More particularly, in conventional practice, wheat is first cleansed and scoured to remove therefrom miscellaneous impurities, such as dust, barley and other foreign seeds. The purified wheat is then conditioned prior to milling or crushing thereof to facilitate easy separation of endosperm from bran and wheat germ and to toughen the bran so as to avoid unduly breaking up of the bran. In accomplishing this, it has been found desirable to expose the wheat to hot air for a short period of time and then immediately cool the wheat in relatively soft water. This toughens the pericarp and seed coat of the wheat and produces a rupture of the endosperm from the bran.

The conditioned wheat is then milled by a conventional sieving operation to produce three fractions, namely, a coarse broad bran fraction containing husks; a finer flour containing bran and germ and a still finer flour of extraction consisting essentially of endosperm. More particularly, the wheat, after milling, is sieved utilizing a series of sieves in the range of 50 to 100 mesh or higher in size wherein the number for a particular sieve indicates the number of meshes per square inch. Employing a series of sieves of No. 50, 70, 90, 100, 110, 120 and 130 in size, the following fractions are obtained for 100 parts of whole wheat:

(a) About 10–15 parts are retained by sieve No. 50; this retained material being fibrous husks (broad bran). As will be pointed out hereinafter, this fractions is discarded and not used in accordance with this invention. The fractions b and c described hereinbelow are used in accordance with this invention.

(b) Of the material passing through sieve No. 50, about 15–20 parts are retained by sieves 50–120 and this retained flour component is a mixture of shorts, red dogs and first and second clears separated from straight flour middlings. This fraction in addition to containing fine bran and germs, contains a small amount of starch which permits uniform mixing with other starch containing flour components. With respect to the amount of fine bran and germ retained by sieves 70–120, it has been found that the finer the retained material, the higher will be the relative amount of germ with respect to the fine bran. Thus, for example, the material (fine bran and germ) retained by sieve No. 110 will have a higher germ to fine bran content than the material retained by sieve No. 70. The ratio of bran to germ in the total material retained by sieves No. 70–120 is in the range of about 7 to 8:1.

(c) The material which passes through sieves of 120 or higher in number is the endosperm. As is understood to those skilled in the field, endosperm passing through sieve No. 130 will be finer in size than passing through sieve No. 120.

In accordance with the instant invention, endosperm (obtained in the aforementioned manner) is treated with water to form a moist endosperm residue containing a high amount of protein, a lower amount of starch and minerals; and (2) a starch solution containing starch removed from said endosperm; separating the starch solution from the moist endosperm residue; and combining said moist endosperm residue with a flour component containing fine bran and germ.

The exact composition of wheat endosperm of course varies depending upon the particular whole wheat from which the endosperm is extracted. In general, the endosperm components are within the ranges indicated:

| Components: | Percent by weight |
|---|---|
| Protein | 11.5–14.0 |
| Moisture | 11.0–13.5 |
| Fat | 0.5–0.7 |
| Ash (minerals) | 0.45–0.60 |
| Fiber | 0.15–0.18 |
| N.F.E. (nitrogen free extract-carbohydrates) | 72–75.5 |

The components of moist endosperm formed in accordance with the present invention in general are in the following amounts:

| Components: | Percent by weight |
|---|---|
| Protein | 22–30 |
| Moisture | 50–65 |
| Fat | 0.25–0.35 |
| Ash (minerals) | 0.20–0.22 |
| Fiber | 0.07–0.09 |
| N.F.E. | 12–16 |

In producing the moist endosperm in accordance with this invention optimum nutritive qualities are obtained if the water employed is acidic in nature and of certain hardness characteristics. If so desired ordinary tap water may be used, but for reasons pointed out hereinbelow the nutritive quality of the resulting moist endosperm is not as high as when the preferred conditions of the pH and hardness of the water are used. The pH of the water should be sufficiently high that significant amounts of starch will go into solution and also so as to not deleteriously affect the proteins present in the endosperm. On the other hand, the pH of the water should be sufficiently low so that the removal of starch may be controlled. Also, the pH should be within an acceptable range to avoid excessive depletion of minerals from the endosperm. In general, it has been found that satisfactory results are obtained when the pH is in the range of about 5.2 to about 6.8.

If the pH of the water is below about 5.2 a significant amount of proteins (amino acids) present in the endosperm is modified or deleteriously affected. Moreover, at a pH below about 5.2 removal of a relatively large amount of starch becomes difficult. On the other hand, if the pH of the water is above 6.8 it becomes difficult to control the removal of the starch as all of the starch tends to dissolve and also there is effectuated removal of a significant amount of desirable mineral components such as phosphorous, sulfur, iron, copper, manganese, etc.

As indicated hereinabove, another factor in obtaining the desired controlled extraction of starch from endosperm is the hardness of the water employed for such extraction. If the water is too hard, it causes a separation from the endosperm of valuable proteins. On the other hand, if the water is too soft, there is caused excessive removal of nutritive minerals. It has been found that optimum results have been obtained when the water has a hardness of about 10 to 30 parts (in terms of calcium carbonate) per 100,000 and, preferably 15 to 25 parts per 100,000.

In carrying out the present invention, it has been found necessary for optimum starch removal and minimum protein depletion to soak the endosperm in the water, having the aforementioned pH and hardness characteristics, for a sufficient period of time to permit any protein tending to separate from the endosperm to be present in suspended form rather than in solution. In general, a soaking time in the range of from 1 to 2 hours has been found to be adequate.

In general, the kneading operation is carried out at a temperature in the range of 25 to 30° C. At temperatures well below the indicated minimum the starch becomes less soluble in the water while at temperatures well above the indicated maximum there is danger of deleteriously affecting the components of the endosperm.

The rate at which the starch is removed from the endosperm will vary depending upon the length and intensity of the kneading operation. As is well understood by those skilled in the field, the more intense the kneading operation the more starch that will be dissolved in the water for a given period of time. When the mixing action is lessened in intensity, a longer time of washing is required for the removal of the same amount of starch than when the kneading action is more intense.

In forming the moist endosperm residue of the present invention, samples of the endosperm residues are periodically removed and tested by conventional techniques for their starch content. The aforedescribed procedures are repeated until the starch has been reduced sufficiently to give a high protein product (22 to 30% protein by weight) but wherein the starch remains in an amount (15 to 20% starch) sufficient to enable subsequent mixing with conventional patent flour. An alternative method for determining the amount of starch removed is to make a graph from previous data plotting the starch removed versus specific gravity of starch solution. When a master graph has been provided, it is then possible to quickly determine from the graph the amount of starch removed from a particular endosperm residue by merely determining the specific gravity of its corresponding starch solution.

The starch solution may be separated from the moist endosperm in any conventional manner such as by use of a strainer (very finely perforated, wire netting of a kneading bowl) through which the starch solution passes but on which the endosperm residue is retained. After the starchy liquid has been separated from the moist endosperm residue, it is preferably subjected to a centrifuging operation for recovery of the starch.

As indicated heretofore, the moist endosperm formed in accordance with this invention is combined with the aforedescribed flour containing fine bran and wheat germ to form a dough of improved nutritive value and which possesses good uniformity, elasticity and compatibility with other flours. As described hereinbefore, the flour containing fine bran and germ used in accordance with this invention are those materials retained by sieves above 50 and below 120 mesh, as for example 70–110. Although the moist endosperm contains elements which are very important to the human diet, in many instances for specific uses, it lacks required nutritive elements, such for example as specific vitamins as illustrated by vitamin $B_1$ (thiamine), vitamin $B_2$ (riboflavin), vitamin E and niacin. Also, increased amounts of minerals are often required such as iron, copper, phosphorous. These important nutritive vitamins and minerals are found in germ and fine bran but are generally removed from wheat flour because of their effect on the baking and keeping qualities of the milled wheat. It has been found, however, that the moist endosperm residue of the present invention may be readily combined with the flour containing fine bran and germ combination described hereinabove in detail to produce a wheat product of unique nutritive qualities.

As indicated hereinabove, the moist endosperm residue is combined with the flour component containing fine bran and germ retained by sieves of a number size above 50 and less than 120, e.g., sieves Nos. 70–110. For example, for 20 parts of such material retained by sieves 70–110, the following breakdown of the individual sievings may be as follows:

| Sieve No.: | Gms. remaining on sieve |
|---|---|
| 70 | 4.3 |
| 90 | 1.1 |
| 100 | 7.7 |
| 110 | 6.5 |
| 120 | 0.4 |

From the foregoing breakdown, it should be pointed out that the sievings retained by sieve No. 110 will have a higher ratio of germ to fine bran than the coarse sievings retained by sieve 90. Thus, if a product having a higher vitamin content is required, it would be preferred to use a predominant amount of the sievings retained by sieve 110 rather than the sievings of sieve 90, since the vitamins are provided mainly by the wheat germ.

In general, the flour containing bran and germ is incorporated in an amount from about 20 to 25 parts per 100 parts of moist endosperm containing about 35 to about 50 parts dry solids (protein, starch, minerals) and about 65 to about 50 parts of water to produce a dough of the following composition:

| Component: | Percent by weight |
| --- | --- |
| Protein | 20–26 |
| Moisture | 46–62 |
| Fat | 0.4–0.5 |
| Ash | 1.4–1.7 |
| Fiber | 1.2–1.7 |
| N.F.E. | 13–18 |
| Vitamins | Remaining |

The following examples illustrate the preparation of a wheat product in accordance with the present invention:

Examples 1 to 3 illustrate the preparation of the moist endosperm in combination with the flour component containing fine bran and wheat germ. Examples 4 and 5 illustrate the preparation of a bread utilizing the wheat product of the instant invention. Example 6 relates to a preparation of a cereal employing the wheat product of the present invention. Example 7 relates to the preparation of macaroni using the wheat product of the present invention.

*Example I*

A Middle East wheat of the following composition:

| Ingredient: | Parts by weight |
| --- | --- |
| Protein | 12.0–13.0 |
| Moisture | 12.0 |
| Fat | 0.56–1.1 |
| Ash | 1.8–1.9 |
| Fibre | 2.0–3.1 |
| N.F.E. (Nitrogen-free extract carbohydrates) | 67.0–69 | is cleansed and scoured in a conventional manner to remove impurities therefrom. The wheat is then exposed to hot air having a temperature of 60° C. for 1 minute. The wheat is then immediately cooled by immersing it in soft water of hardness of not more than 20 parts per 100,000 and having a pH in the range of 6.25 to 6.40. The thus treated wheat is then crushed by milling the wheat employing rollers at low speed and at a temperature between 32–35° C. The milled wheat product is then sieved utilizing sieves of 100–130 U.S.P. mesh. The flour that passes through sieve mesh 130 is the endosperm which is subsequently treated for removal of starches, this endosperm being designated No. 1 flour.

The endosperm, obtained by the foregoing operation, is then kneaded with soft water of hardness 10 pt./100,000 having a pH of 6.25–6.40 and at a temperature of 32°–35° C. The kneading is done by an electrical kneading machine capable of operating at three speeds in which the speed is progressively increased during the kneading operation. Water is continuously added while kneading. After a 15 minute soaking period, the water is removed by any conventional manner, such as by draining, to a centrifuge and a fresh quantity of water is added and the above procedure repeated until about 80% of starches are removed, to produce an endosperm residue having a protein content of 29.5–30% and a moisture content of 65%. The percent of starches removed can be determined by any known method such as by chemical analysis. The starchy liquid passed to the centrifuge is collected by centrifuging and removed as a secondary product of the invention.

One kilogram of moist endosperm produced in the above manner is then combined with 250 grams of the flour component containing fine bran and germ retained by sieves of a number size above 50 and less than 120 (e.g., 60–70 mesh size). The flour component containing fine bran and germ includes minerals (Ca, Mg, P, S, Fe, etc.) and important vitamins (E, $B_1$, $B_2$ and niacin). After the addition of the flour containing fine bran and germ to the moist endosperm, the whole is mixed in an electrical kneading machine at high speed for about 30 minutes. This mixture is immediately placed in a refrigerator for 40–48 hours to preserve its strength and also to prevent any fermentation and maltose formation. This dough may be baked to form a dietetic food, or may be combined with conventional flours to form biscuits, cereals, and the like.

*Example II*

From 1.5 kilograms of wheat (whole) there is obtained by means of sieving in a manner described hereinbefore 1 kilo of endosperm. The kilo of endosperm is then soaked for 1½ hours and subsequently kneaded with water having a pH of 6.0 and a hardness of 20 parts per 100,000 in a manner described in Example I to remove starch therefrom. The resulting moist endosperm residue (450 g. solids) is then mixed with 200 grams of flour containing fine bran and germ retained by sieves 70–100. The resulting mixture has the following analysis:

| | Percent |
| --- | --- |
| Moisture | 50–60 |
| Protein | 25–30 |
| Sugar and pentoses | 4 |
| Starches | 12 |
| Remaining compounds (crude fibers, minerals, vitamins, etc.) | Remainder |

One kilo of the above mixture containing 2 grams of yeast is then baked in the form of sticks at 90–105° C. for 1 hour to yield a rusk having the following formula:

| | Percent |
| --- | --- |
| Moisture | 6–8 |
| Protein | 52–56 |
| Starches | 22–25 |
| Remaining components (mineral, vitamins, crude fibres) | Remainder |

*Example III*

One kilo of endosperm of the following composition:

| | Grams |
| --- | --- |
| Moisture | 130 |
| Protein | 120 |
| Sugar and pentoses | 45 |
| Starches | 700 |
| (Minerals, crude fibres and miscellaneous components) | 5 | is mixed with water having a pH of 6.0 and a hardness of 20 parts per 100,000 and subsequently kneaded in a manner described in Example I. When the starchy liquid is separated, the moist endosperm residue, when calculated on the same basis of moisture content of the original endosperm would have the following composition per 1000 grams:

| | Grams |
| --- | --- |
| Moisture | 130 |
| Protein | 643 |
| Sugar and pentoses | 15 |
| Starches | 207.8 |
| (Minerals, crude fibres and miscellaneous components) | 4.2 |

The above example illustrates the enrichment in protein and reduction in starch in accordance with this invention. The increase in protein in the treated product as compared to the original is about 5.3 as much and the decrease in starch content is about 3.4 times as much with no excessive loss of minerals.

In order to control the protein and mineral content of the above residue and to impart vitamin qualities thereto, 200 to 250 grams of flour containing fine bran and germ are added per kilo of moist endosperm, said bran and germ being obtained by the following sievings:

| Sieve No. Meshes | Percent Taken | Protein Content Percent |
|---|---|---|
| 70 | 21.5 | 12.65 |
| 90 | 5.5 | 13.86 |
| 100 | 38.5 | 14.50 |
| 110 | 32.5 | 15.84 |
| 120 | 2.0 | 16.61 |

*Example IV*

This example represents a method for the production of bread in accordance with the present invention.

One hundred parts of the unbaked final composition (moist endosperm and flour containing fine bran and germ) of Example II is combined with the following ingredients:

| | Parts |
|---|---|
| Cake flour | 100 |
| Water | 24 |
| Yeast | 2 |
| Malt | 1 |
| Sugar | 1½ |
| Salt | 1 |

The yeast is dissolved in a portion of water. The remainder of water, sugar, malt, salt, the unbaked endosperm, bran and germ mixture, and part of the cake flour are mixed well together in a kettle. The yeast solution is then added and the mix is put in a mixer with slow speed for 30 minutes. The fermentation requires about six hours at a temperature of about 80° F.

The bread is then baked at 440° F.

The protein in the bread and on the basis of 30% moisture would be about 27% and the carbohydrates content about 40%. The bread is rich in minerals such as iron, phosphorous, etc. and vitamins such as vitamin B, $B_2$ and niacin.

*Example V*

This is another example of a preparation of bread in accordance with the present invention employing the procedure described in Example IV and formed from the following recipe:

| | Parts |
|---|---|
| Unbaked composition of Example II | 100 |
| Flour | 200 |
| Water | 32 |
| Yeast | 2½ |
| Malt | 1½ |
| Sugar | 2 |
| Salt | 2 |

The bread produced from the above recipe will have a protein content of about 20% and a carbohydrate content of about 46%. As in the previous example, the resulting product is rich in nutritive minerals and vitamins.

*Example VI*

This example illustrates the preparation of a cereal in accordance with the present invention.

Ingredients:

| | Parts |
|---|---|
| Unbaked composition of Example II | 100 |
| Patent flour | 100 |
| Water | 47 |
| Sugar | 5 |
| Salt | 0.1 |
| Malt | 0.2 |
| Yeast | 2 |

2 parts of the yeast are dissolved in a portion of the water. The remainder of the water is added to the unbaked Proto. The patent flour is sifted into the dough and the mixture well stirred. The salt, sugar and malt are added to the mix during stirring. The solution of yeast is then added to the mixture and worked into it. Fermentation will require about 6 hours at 80° F.

The dough is formed into a variety of shapes satisfactory for a breakfast cereal and then baked at 425° F.

*Example VII*

This example illustrates the preparation of macaroni in accordance with the present invention.

Ingredients:

| | Parts |
|---|---|
| Unbaked composition of Example II | 100 |
| Farina flour | 300 |
| Water | 150 |

A paste is made by mixing 100 parts of unbaked composition with 300 parts of Farina flour and 150 parts of water. The paste is then formed under pressure into shapes characteristic of macaroni or spaghetti. The molded paste is then dried in an oven.

The invention in its broader aspect is not limited to the specific steps, compositions, combinations and improvements described but departures may be made therefrom within the scope of the accompanying claims without departing from the principles of the invention and without sacrificing its chief advantages.

This application is a continuation-in-part of application Ser. No. 672,885, filed July 19, 1957, which in turn is a continuation-in-part of application Ser. No. 581,846, filed May 1, 1956.

What is claimed:

A process for the manufacture of a wheat product of high nutritive value, stability, versatility and relatively low calorie content from two wheat fractions of milled wheat, one fraction being wheat endosperm which is that material of milled wheat which passes through a sieve of No. 120 mesh size and the other fraction being a flour containing fine bran and germ which is that material of milled wheat which passes through sieve No. 50 mesh size but which is retained by sieves having a mesh size from above No. 50 to No. 120, said process, comprising mixing said wheat endosperm with water to form an endosperm dough, washing said endosperm dough sufficiently with water to extract therefrom starch in an amount sufficient to leave a moist endosperm residue containing about 50 to about 65% by weight water, about 22 to about 30% by weight protein and about 15 to about 20% by weight starch, the extracted starch being dissolved in the water wash to form said starch solution, separating said starch solution from said moist endosperm residue, and combining said moist endosperm residue with a flour containing fine bran and germ, said flour being in an amount from about 20 to about 25 parts per 100 parts of moist endosperm residue.

References Cited in the file of this patent

UNITED STATES PATENTS

| 334,245 | Lauer | Jan. 12, 1886 |

FOREIGN PATENTS

| 251 | Great Britain | 1859 |
| 3,938 | Great Britain | 1875 |
| 20,699 | Great Britain | 1892 |
| 19,357 | Great Britain | 1897 |
| 3,650 | Great Britain | 1906 |

OTHER REFERENCES

"The Technology of Bread Making," by Jago, 1921, publ. by Bakers Helper Co. (Chicago), pp. 479–481.

Siebel's Manual for Bakers and Millers, 2nd ed., 1924, publ. by The Siebel Inst. of Technology (Chicago), pp. 22, 28 and 29.

"Modern Cereal Chemistry," by Kent-Jones et al. 1947, published by The Northern Publishing Co., Ltd. (Liverpool), pp. 152–154.